Aug. 15, 1939.   P. J. HERBST   2,169,838
TELEVISION SIGNAL REPRODUCING TUBE
Filed April 29, 1938
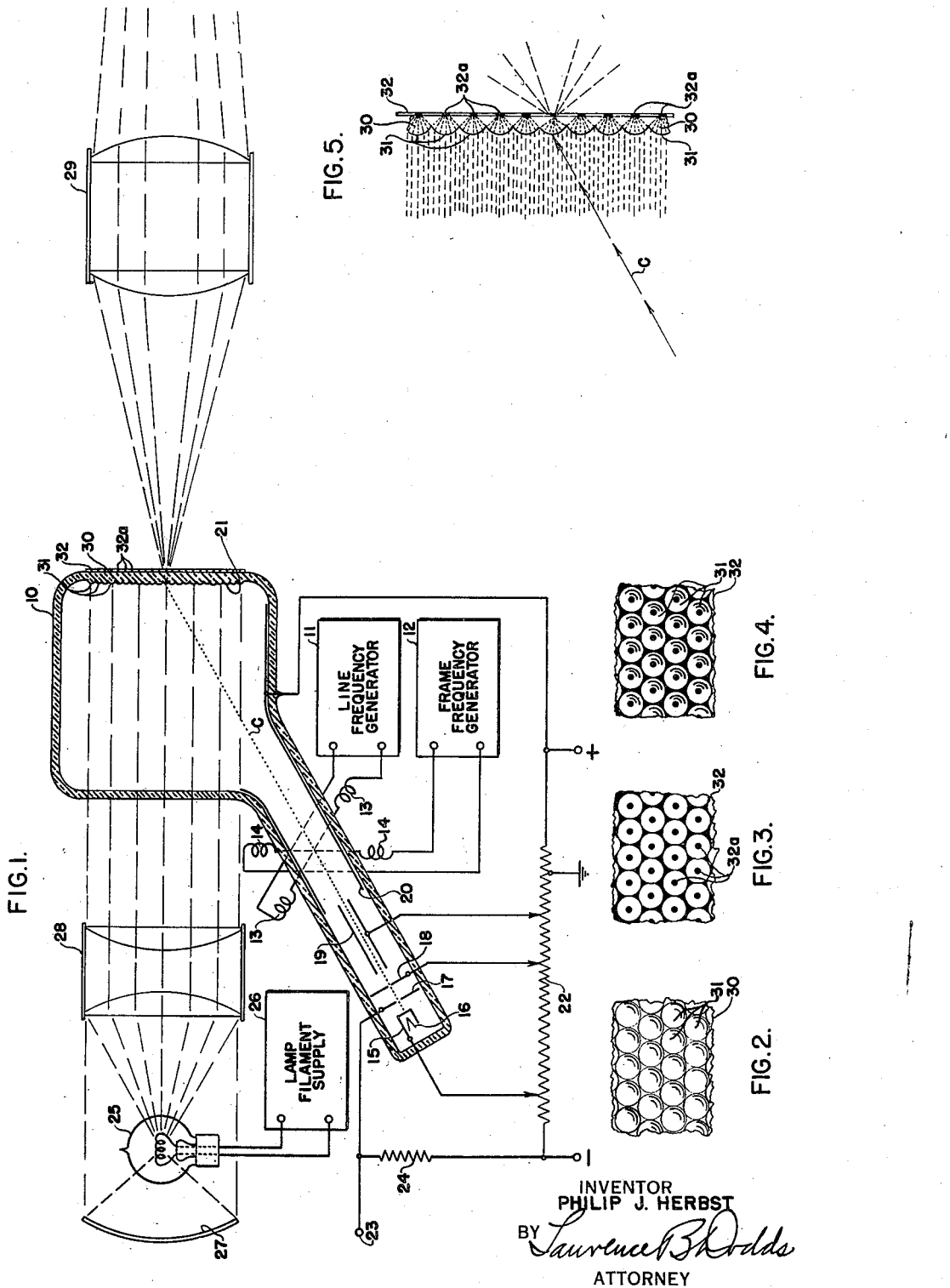
INVENTOR
PHILIP J. HERBST
BY Laurence B. Dodds
ATTORNEY Patented Aug. 15, 1939

2,169,838

UNITED STATES PATENT OFFICE 2,169,838

REISSUED

TELEVISION SIGNAL REPRODUCING TUBE

Philip J. Herbst, Bayside, N. Y., assignor to Hazeltine Corporation, a corporation of Delaware

JUN 16 1942

Application April 29, 1938, Serial No. 204,959

5 Claims. (Cl. 250—164)

This invention relates to television signal-reproducing devices of the scanning-ray tube type and particularly to new and improved targets for such device. The invention is especially directed to the provision of an improved target for a scanning-ray tube whereby the transmission of light from an independent source may be controlled by the scanning ray to reconstruct a transmitted image with a higher intensity of illumination than is generally attainable in scanning-ray tubes.

This type of light control is generally referred to in the art as electrical transparency control. It has heretofore been proposed to employ such a control in connection with signal-reproducing tubes of television systems for the purpose of reconstructing an image sufficiently bright to permit of its being projected in an enlarged size on a screen spaced from the tube. In general, systems previously proposed to provide control of this type have been subject to various objections including instability and the fact that they involve impractical or complicated apparatus.

It is an object of the present invention, therefore, to provide an improved target for a scanning-ray tube of a television signal-reproducing system whereby a practical electrical transparency control may be obtained.

In accordance with the present invention, there is provided a scanning-ray tube target for a television signal-reproducing system which comprises a multiple lens system including a plurality of juxtaposed lens elements. A screen is disposed adjacent the lens system and the lens elements are adapted individually to focus light rays from a given source onto restricted areas of the screen. The screen is generally transparent but opaque over the areas on which the light rays are normally focused by the lens system. Preferably the opaque areas are determined by, and complementary to, the lens system itself, thereby avoiding the effects of any irregularities or defects in the lens system. Each of the lens elements has the property of varying its focus with respect to the screen in response to excitation by a scanning ray. When the target is scanned by a ray, therefore, the foci of the successive lens elements are varied so as to permit the light rays from the independent source to pass through the screen adjacent their respective opaque areas.

In accordance with one approved embodiment of the invention, the target comprises a transparent plate having one of its surfaces formed to provide a plurality of convex juxtaposed incremental areas which serve as the lens elements. The focal lengths of these elements are substantially equal to the thickness of the plate so that the lens elements are adapted normally to focus the light rays from the source on individual areas at the opposite surface of the plate. The screen is preferably formed as a film of photographic emulsion disposed over the focal surface of the plate. The screen, while generally transparent, is developed and fixed, after exposure to light from the source focused thereon by the lens elements, so as to provide the opaque portions over the individual focal areas of the lens system and, therefore, to be normally substantially completely opaque to light from such source.

For a better understanding of the invention, together with other and further objects, reference is had to the following description taken in connection with the accompanying drawing, and its scope will be pointed out in the appended claims.

In the accompanying drawing, Fig. 1 is a schematic diagram of a portion of a television receiver including a cathode-ray signal-reproducing tube embodying a target constructed in accordance with the present invention; Figs. 2, 3, and 4 are fragmentary plan views of portions of the target structure of the present invention, Fig. 2 showing the lens system separately, Fig. 3 the screen separately after development, and Fig. 4 the lens system with the screen applied thereto; while Fig. 5 is a diagrammatic fragmentary end view of a portion of the target.

Referring now more particularly to Fig. 1, the portion of the television receiver there illustrated includes a cathode-ray signal-reproducing tube 10 and line-frequency and field-frequency generators 11 and 12 having their output circuits connected to scanning coils 13 and 14, respectively. The cathode-ray signal-reproducing tube 10 includes the usual electron gun comprising a cathode 15 having a heater element 16, a control grid 17, an accelerating anode or screen 18, a focusing anode 19, and a second anode 20, which generally comprises a conductive coating on the interior surface of the envelope. The electron gun serves to develop, accelerate, and focus a beam of electrons or cathode rays, indicated at C, toward a target 21, which embodies the present invention and will be hereinafter described in detail.

Proper operating potentials are applied to the various electrodes of a cathode-ray tube from a suitable source, for example, a voltage divider 22 connected across a source of unidirectional voltage as indicated, by way of connections to the various electrodes from suitable points on the voltage divider. A connection 23 is provided for applying the video-frequency modulation voltages to be reproduced to the control grid 17 by way of a suitable leak resistor 24.

In conventional cathode-ray signal-reproducing tubes, the target 21 usually comprises a fluorescent screen which becomes luminous when excited by the cathode ray during the scanning operation. The operation of the system just described, assuming for the moment that a conventional fluorescent screen is employed as the target, is well understood in the art and a detailed explanation thereof is unnecessary. Briefly, however, a cathode ray is developed, accelerated, and focused by the electron gun toward the target in the well-known manner. Deflecting currents developed by generators 11 and 12 are applied to the scanning coils 13 and 14 to provide magnetic fields to deflect the cathode rays horizontally and vertically, thereby to scan successive fields of horizontal parallel lines on the target. During this scanning action, the intensity of the ray is varied in accordance with the video-frequency modulation voltage applied to the control grid 17, corresponding to different values of light and shade in the successive elements of images being transmitted, so that the images are reconstructed on the fluorescent screen by successive spots of light of varying intensity. While a fluorescent screen cathode-ray tube, such as just referred to, has proven generally satisfactory, the size of the tube necessarily limits the size of the picture that can be reproduced thereon. Moreover, such a fluorescent screen ordinarily does not provide a sufficiently intense light to permit projection of the reconstructed picture and enlargement thereof on a separate screen.

In accordance with the present invention, therefore, the improved target 21 is provided whereby a practical electrical transparency control is obtained. To this end, a source of illumination, as indicated by the lamp 25, is disposed adjacent the transparent end of the tube 10 opposite the target 21. A suitable source 26 of filament voltage supply is provided for the lamp 25, while a reflector 27 and condenser lens 28 may be disposed adjacent thereto to concentrate the light from the lamp and focus it in parallel rays on the inner surface of the target. Adjacent the opposite end of the tube a projecting lens system 29 is preferably disposed, so that light images reconstructed on the target, as presently to be described, may be projected on a screen (not shown) to provide an enlarged reproduction of the image.

Referring now more particularly to the target 21, its construction and operation may best be explained with reference to Figs. 2–5, inclusive. Preferably, the target comprises a transparent plate 30 having one of its surfaces formed to provide a multiplicity of separate minute convex juxtaposed lens elements 31. A portion of the plate and its lens elements alone are shown in Fig. 2. The lens elements are so shaped as to have focal lengths substantially equal to the thickness of plate 30, so that normally they focus parallel light rays received from the source 25 by way of the lens system 28 on individual areas at the opposite surface of the plate 30. A screen 32, a portion of which is shown separately in Fig. 3, is disposed over the outer surface of the plate 30. The screen is generally transparent but is opaque, as indicated at 32a, over the individual areas on which the light rays are normally focused by the lens system. In Fig. 4 the portion of the plate shown in Fig. 2 is shown superimposed on the corresponding screen portion shown in Fig. 3. Preferably, the opaque portions of the screen are determined by, and complementary to, the lens system itself and, in accordance with the preferred embodiment of the invention, this is accomplished by the particular manner in which the screen is constructed.

Referring more particularly to the construction of the target, the plate 32 and its lens elements may, for example, be formed by disposing a layer of spherical transparent elements of quartz or other suitable material over a sheet of transparent material, such as glass. This structure may be then heated to incipient fusion and the spherical elements pressed into the glass sheet so as to form a substantially integral structure. The cathode-ray tube may then be assembled with the plate-like lens structure forming one end thereof as shown in Fig. 1. As the final step in the tube construction, a suitable photographic emulsion may be applied to the outer surface of the plate 30. The emulsion may thereupon be exposed to rays of light from the source 25, focused thereon through the lens system 28, and subsequently the emulsion may be developed and fixed, thereby to provide the screen 32 which is generally transparent but includes opaque areas complementary or corresponding to, and determined by, the lens system itself, thereby avoiding the leakage of light through the screen that would result from any failure of the focal areas of the lens system to register with the opaque areas which might otherwise result due to the minute size of the lens elements.

The substance of the lens elements is such as to give them the property of varying their focus with respect to the screen in response to excitation by a scanning ray, thereby to permit the light rays to pass through the screen adjacent their respective opaque areas. More particularly, changes in temperature or the well-known piezoelectric effect caused by the impingement of a scanning beam, such as a cathode ray, on the lens elements, effect variations either in the physical configuration of the lens elements or in their indices of refraction, or both.

The lens elements may be of any suitable material, such as quartz in the crystalline stage, which exhibits sensitivity to electron bombardment, both as to changes in its dimensions and its index of refraction and which is also quite satisfactory for the purpose of sealing in vacuum. Also certain salts, such as Rochelle salts, may be used. The latter, while more sensitive to electron bombardment than quartz, is not, however, as adaptable for use in high vacuum apparatus, which must generally be exhausted at high temperatures. The individual lens elements may be formed by grinding small crystals in a continuously rotating mill, until they assume the required spherical form.

In Fig. 5 a portion of the target is shown with parallel light rays, indicated by the broken lines, passing through its lens elements. Under normal conditions, the rays are focused by the lens elements 31 on the opaque portions 32a of the screen, as shown. A cathode ray, however, indicated at C, is shown impinging upon one of the lens elements and varying its focus, as described above, so that the defocused light rays pass through the screen at the portions adjacent the opaque portions corresponding to this particular lense element.

In the operation of the receiving apparatus embodying the present invention which is shown in Fig. 1, the light rays from the source 25 are projected by means of the lens system 28 in parallel rays on the inner surface of the target 21. Due to the focusing of the rays by the elements 31 and the complementary opaque portions of the screen 32, however, no light normally passes through the target. However, as the electron beam C is deflected to scan a series of parallel lines or fields on the target, it successively impinges upon the lens elements 31 and effects a variation in their foci, to an extent corresponding to the intensity of the electron beam as controlled by the video-modulation signal applied to the control grid of the tube. This defocusing action thus permits the light rays to pass through the areas of the screen adjacent the opaque portions corresponding to the particular lens elements on which the beam is focused, the amount of the light transmitted through each incremental area being dependent upon the amount of defocusing of the lens elements included in such area and thus on the intensity of the cathode-ray beam. The transmitted image is thus apparently reconstructed on the outer surface of the target. Moreover, the brightness of this image is sufficiently intense to permit its being projected by the lens system 29 upon a suitable screen spaced from the target, thereby to provide an enlarged image. The size of the lens elements will be substantially smaller than the size of the cathode-ray spot, preferably having a diameter of the order of one-tenth the diameter of the spot to ensure uniformity of the lens action.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A scanning-ray tube target for a television signal-reproducing system comprising a multiple lens system including a plurality of juxtaposed lens elements, a screen adjacent said lens system, said lens elements being proportioned to focus parallel light rays on individual separate areas of said screen, said screen being generally transparent but opaque over said areas, each of said lens elements having the property of varying its focus with respect to said screen in response to excitation by a scanning ray, thereby to permit said light rays to pass through said screen adjacent its respective opaque area.

2. A scanning-ray tube target for a television signal-reproducing system comprising a multiple lens system including a plurality of juxtaposed lens elements, a screen adjacent said lens system, said lens elements being adapted to focus parallel light rays on said screen, said screen being generally transparent but having opaque areas determined by, and complementary to, said lens system, whereby said target is normally opaque to said light rays, each of said lens elements having the property of varying its focus with respect to said screen in response to excitation by a scanning ray, thereby to permit said light rays to pass through said screen adjacent its respective opaque area.

3. A scanning-ray tube target for a television signal-reproducing system comprising a transparent plate having formed on one of its surfaces a plurality of convex juxtaposed incremental areas comprising separate lens elements having focal lengths substantially equal to the thickness of said plate, whereby said lens system is adapted to focus parallel light rays on individual areas at the opposite surface of said plate, a screen disposed over said opposite surface, said screen being generally transparent but opaque at portions corresponding to said focal areas, each of said lens elements having the property of varying its focus with respect to said opposite surface in response to excitation by a scanning ray, thereby to permit light rays to pass through said screen adjacent its respective opaque areas.

4. A scanning-ray tube target for a television signal-reproducing system comprising on one surface thereof a multiple lens system including a plurality of juxtaposed lens elements, a screen comprising a film of photographic emulsion disposed on the opposite surface of said target, said lens system being proportioned to focus parallel light rays on individual areas at the opposite surface of said target, said screen being generally transparent but developed and fixed after exposure to light rays focused thereon by said lens elements to render said areas opaque, each of said lens elements having the property of varying its focus with respect to said screen in response to excitation by a scanning ray, thereby to permit said light to pass through said screen adjacent its respective opaque area.

5. A scanning-ray tube target for a television signal-reproducing system comprising a transparent plate having formed on one of its surfaces a plurality of convex juxtaposed incremental areas providing separate lens elements having focal lengths substantially equal to the thickness of said plate, whereby said lens system is adapted to focus parallel light rays on individual areas at the opposite surface of said plate, a screen comprising a film of a photographic emulsion disposed over said opposite surface, said screen being generally transparent but developed and fixed after exposure to said light rays focused thereon by said lens system to render said areas opaque, each of said lens elements having the property of varying its focus with respect to said screen in response to excitation by a scanning ray, thereby to permit said light rays to pass through said screen adjacent its respective opaque area.

PHILIP J. HERBST.